United States Patent [19]

Stanfield

[11] Patent Number: 4,838,596
[45] Date of Patent: Jun. 13, 1989

[54] DISH CARRIER

[76] Inventor: John Stanfield, 425 Riverhill Dr., Atlanta, Ga. 30328

[21] Appl. No.: 179,956

[22] Filed: Apr. 11, 1988

Related U.S. Application Data

[63] Continuation-in-part of Ser. No. 90,548, Aug. 28, 1987, Pat. No. 4,786,096.

[51] Int. Cl.$^4$ .............................................. B25H 3/04
[52] U.S. Cl. .................................. 294/137; 294/143; 294/161
[58] Field of Search ............... 294/137, 143, 158, 161, 294/144, 172, 159, 160, 162, 163; 211/41, 49.1, 126, 184, 187, 188, 175, 207; 220/23.6, 23.8, 23.83, 23.86, 19, 95; 206/503, 504, 510

[56] References Cited

U.S. PATENT DOCUMENTS

| | | |
|---|---|---|
| 953,007 | 3/1910 | Haller . |
| 1,065,633 | 6/1913 | Stone . |
| 1,519,874 | 12/1924 | Page . |
| 1,888,141 | 11/1932 | Orth . |
| 2,087,375 | 7/1937 | Ehrhardt ............................. 224/45 |
| 4,385,781 | 5/1983 | Welsch ................................ 294/161 |

Primary Examiner—James B. Marbert
Attorney, Agent, or Firm—Thomas & Kennedy

[57] ABSTRACT

A dish carrier has a rectangular base plate that has a flat top surface and four side edges. The base plate is formed with four rows of slots that extend from adjacent the four side edges towards the base center. Four resilient arms are releasibly mounted to the four rows of slots selected with regard to the size of dishes to be carried stacked upon the base top surface with their sides held by the arms.

10 Claims, 4 Drawing Sheets

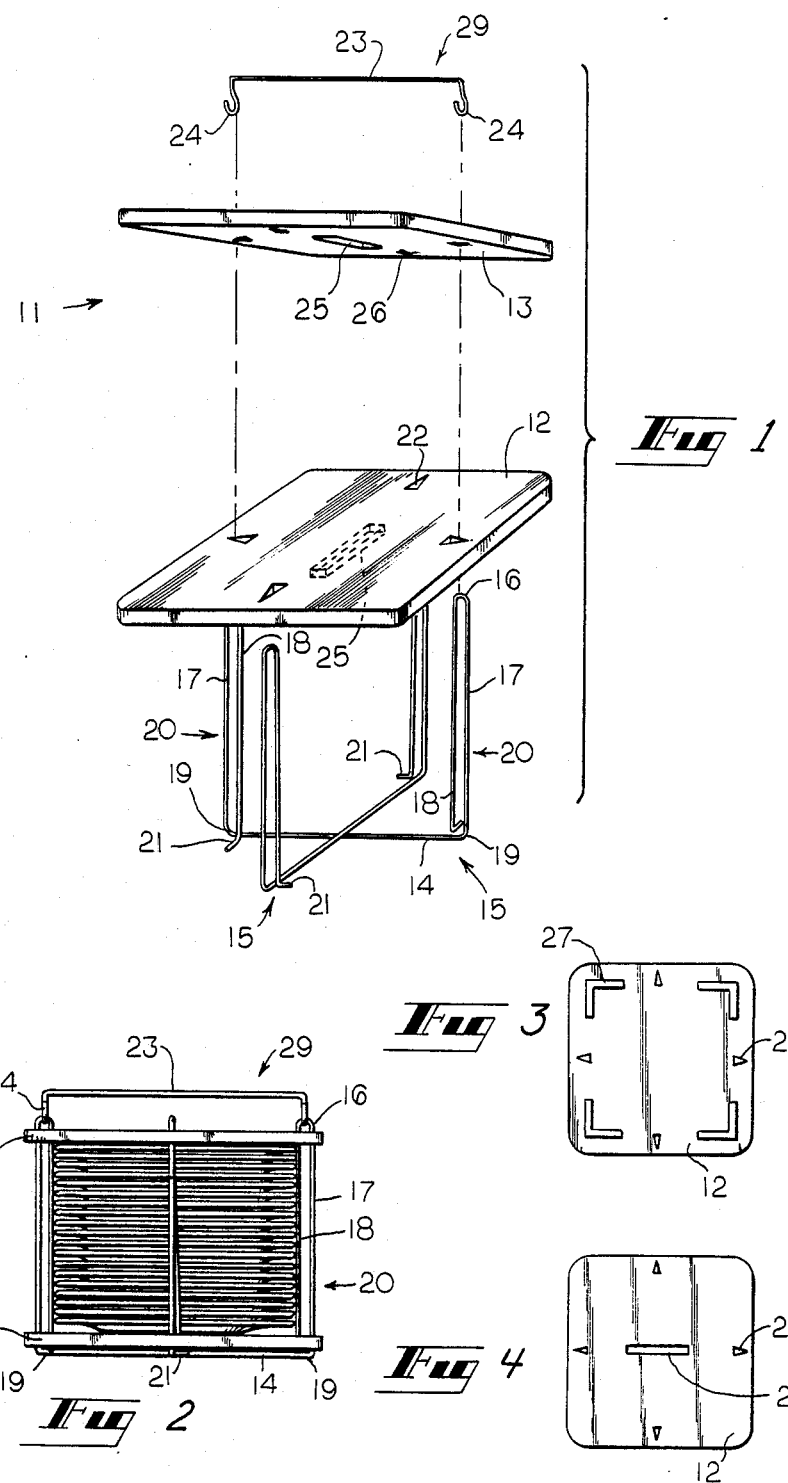

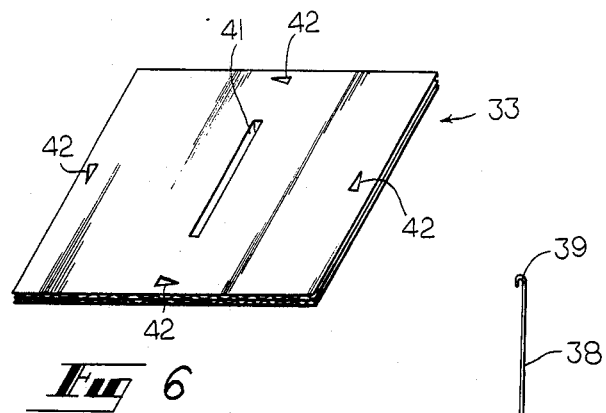
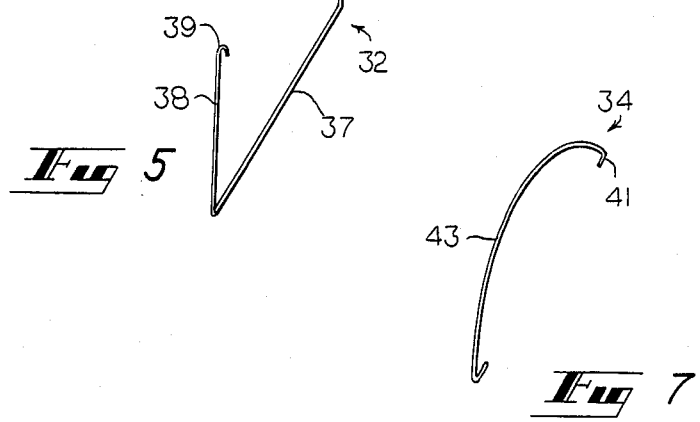
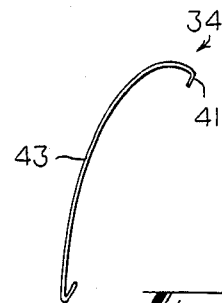
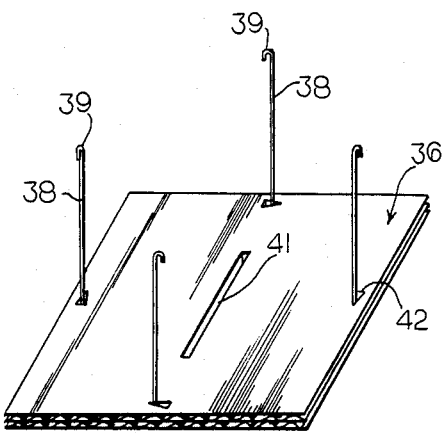
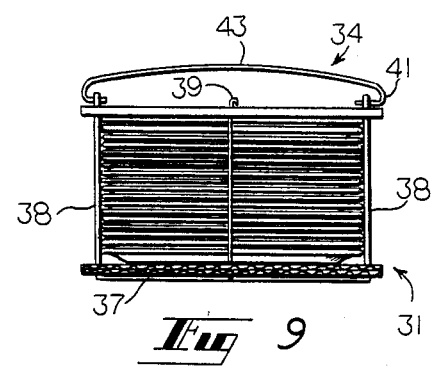

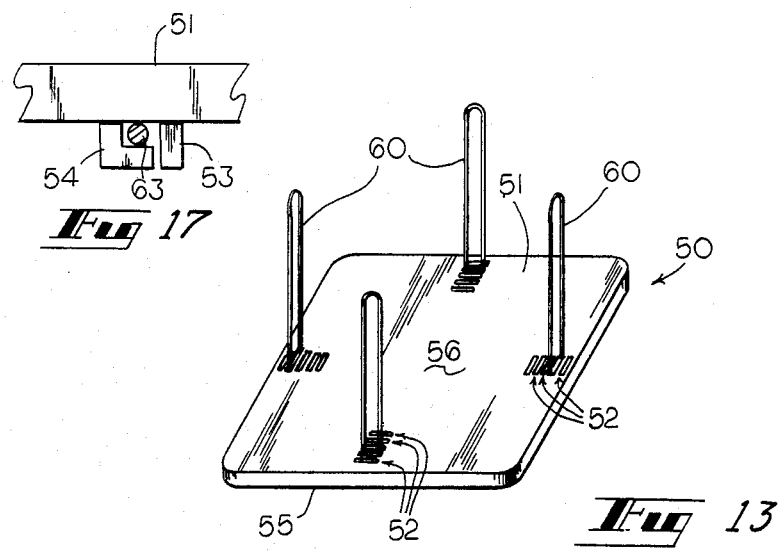
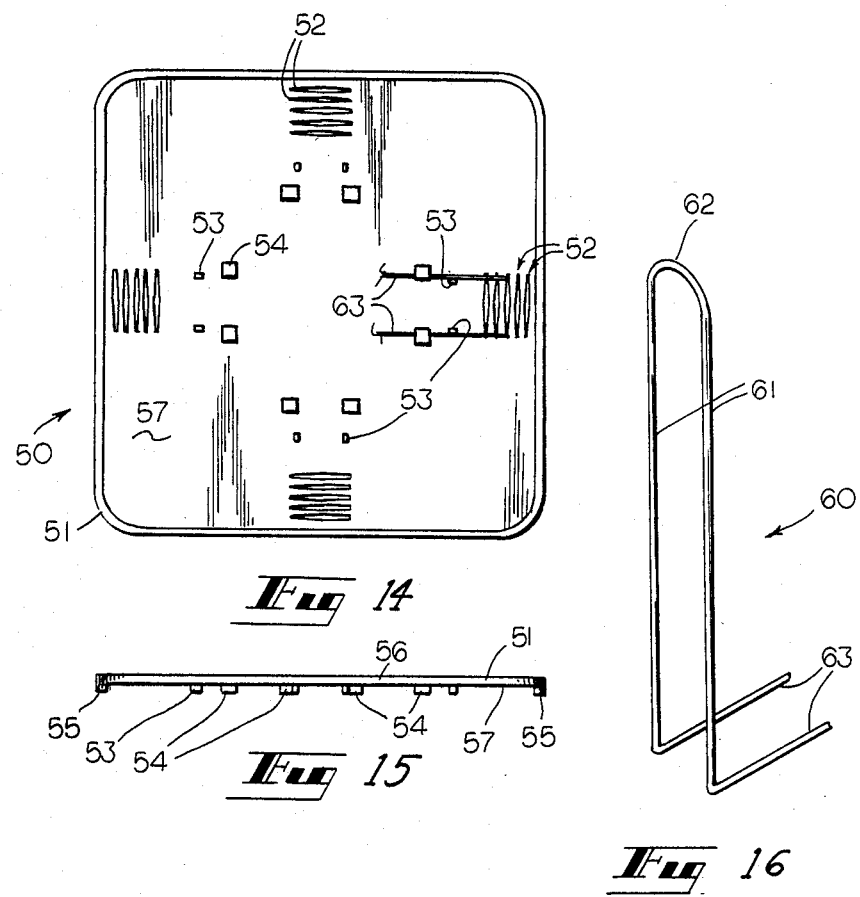

DISH CARRIER

REFERENCE TO RELATED APPLICATION

This is a continuation-in-part of application Ser. No. 090,548, filed Aug. 28, 1987, now U.S. Pat. No. 4,786,096.

TECHNICAL FIELD

The present invention relates to carrying devices and more particularly to a device for carrying a stack of plates or dishes.

BACKGROUND OF THE INVENTION

It is common in the restaurant, tableware rental, food catering and moving industries for large numbers of plates or dishes to be stored and transported in stacks for economy of space and handling efficiency. Considerable difficulty can be encountered in handling stacks of dishes because they are fragile, heavy and cumbersome to handle. As a consequence, dishes are often dropped and breakage is common.

Previous attempts to solve the problems associated with transporting and storing large numbers of dishes have met only limited success. U.S. Pat. No. 2,087,375 of Ehrhardt exemplifies such prior art devices. It describes a carrying device having a plurality of upright staves connected by horizontal flexible members with a handle attached to the top of two of the upright staves. To use this type of carrying device, a number of plates are stacked on a surface and the device is wrapped around the stack and fastened with latches attached to two of the upright staves.

Not only are devices of this type bulky and difficult to store, they require that plates be stacked on a surface before the device is applied. Wrapping such a device around a stack of plates however can be manually difficult and can cause the stack of plates to topple and break. Moreover, the flexible connecting members of the device itself tends to obscure the plates making it difficult to inspect or count them without removal from the carrying device.

Plate racks such as those illustrated in U.S. Pat. Nos. 953,007 of Haller and 1,888,141 of Orth can be used to carry a set of dishes or plates. They, however, are designed for carrying plates of food to be served with the plates spaced from each other and thus not compactly arranged in stacks.

Accordingly, it is seen that a need exists for a dish carrier by which a stack of dishes or plates may be easily transported and stored in a simple and economic manner with minimal risk of breakage. It is to the provision of such that the invention is therefore primarily directed.

SUMMARY OF THE INVENTION

The present invention is a lightweight, versatile dish carrier for transporting and storing a stack of dishes or plates. In a preferred embodiment the dish carrier has a base made of plastic or other sturdy material formed with arm receiving holes around its edges. Two generally U-shaped, wire posts having double stranded upright arms connected by a bight portion extend from the bottom of the base upwardly through the arm receiving holes so that their bights cross on the underside of the base and their arms extend upwardly from an upper surface of the base adjacent its edges. A cover is provided that has substantially the same shape as the base and that also has arm receiving holes located adjacent its edges which may be passed downwardly to receive the wire arms so that the cover is slidable on the arms toward and away from the base. To insure that the carrier may be supported securely on a support surface, a set of feet may be formed on the bottom of the base that project downwardly below the crossing bight of the two wire posts. Alternatively, a slot or groove may be formed in the bottom of the base extending between two of the arm receiving holes to receive the bight of one of the posts so that the crossing of the two bight portions does not create a bulge at their crossings.

Each upright arm has an outer strand located proxially to the base periphery and an inner strand located distally to the base periphery and spring biased away from the outer strand by the inherent resiliency of the wire. The inner strands of the upright arms have a free end adjacent the base and lie generally in a circle that is the same diameter as a stack of plates to be carried. With this construction, when a stack of plates is passed down between the posts and onto the base, the inner strands of the posts hold it firmly in place. The cover may then be slid down over the wire posts to rest atop the stack of plates. The arm receiving holes in the cover force the outer strands of the wire posts to maintain a position parallel to each other while the flexibility of the inner strands causes them to maintain pressure against the stack of plates. Because the inner strands are free at the bottom and connected to the outer strands at the top, this pressure is progressively greater toward the top of the stack tending to press the stack downward against the base, further insuring stability. A handle, which is releasibly attachable to the upper ends of two of the wire posts, may then be attached so that the carrier securely holding the stack may be hand carried.

In an alternate embodiment, a disposable form of the dish carrier is provided in which the base and the cover are made from a quite inexpensive material such as cardboard. In this embodiment the wire posts are single stranded and have a hook formed at their top ends. A number of dishes are stacked on the base such that when the cover is placed over the posts and onto the top of the stack, the edges of the cover in the area of its arm receiving holes may be depressed slightly allowing the hooks to be moved laterally over the top of the cover so that when the depressed edges are released, the hooks dig into the top of the cardboard cover holding it in place atop the stack. A handle may then be attached to two of the posts. This embodiment is particularly useful for manufacturing companies that package large numbers of plates of the same size. They may place filled carriers into cartons for shipment which may be removed at their destination for counting, inspecting, and storage.

A third embodiment is similar to the first but has three-stranded arms extending upwardly from the base instead of two-stranded arms. In this embodiment, the inner and outer strands remain parallel and the center strand is skewed in response to dishes being stacked between the arms. In this way, the inner strands are maintained in firm contact with the stack of dishes and a greater range of dish sizes can be accommodated by a single size carrier.

In another form of the invention, a dish carrier comprises a base formed with at least three slots located adjacent the base periphery about a base central portion. At least three resilient wires are provided which are adapted to be mounted to the base so as to extend through the slots. Each of the resilient wires has two generally parallel arms that extend from a connecting bight to two generally parallel legs that extend angularly from the arms. Three holding means are mounted to the bottom of the base adjacent the three slots for holding the wire legs snuggly to the base bottom with the legs extending through the slots.

In yet another form of the invention, a dish carrier comprises a rectangular base plate having a flat top surface and four side edges. The base plate is formed with four rows of slots that extend from adjacent the four side edges towards the base plate center. Four resilient arms are releasably mounted to the base with each arm extending through a slot of each of the four rows of slots selected with regard to the size of dishes to be carried stacked upon the base plate top surface with their sides held by the arms.

In none of the embodiments need horizontal connecting members necessarily extend between the posts about the stack. Therefore, dishes may be inspected and counted without removing them from the dish carriers. For display and sale of the carriers themselves, the wire posts and handles may simply be laid between the base and cover forming a compact package that may be wrapped, labeled and displayed.

BRIEF DESCRIPTION OF THE DRAWINGS

FIG. 1 is an exploded view, in perspective, of a dish carrier in one preferred embodiment.

FIG. 2 is a side elevation view of the dish carrier of FIG. 1 shown assembled and holding a set of dishes.

FIG. 3 is a bottom view of an alternative form of the base member of the dish carrier of FIGS. 1 and 2.

FIG. 4 is a bottom view of the dish carrier shown in FIG. 2.

FIG. 5 is a perspective view of one wire post member of a second preferred embodiment of the dish carrier.

FIG. 6 is a perspective view of the base of the second embodiment.

FIG. 7 is a perspective view of the handle of the second embodiment.

FIG. 8 is a perspective base of the second embodiment shown with the wire posts mounted to the base.

FIG. 9 is a side elevation view of the second embodiment shown assembled and holding a set of dishes.

FIG. 13 is a perspective view of a fourth preferred embodiment of the dish carrier.

FIG. 14 is a bottom view of the dish carrier illustrated in FIG. 13 in a partially assembled configuration.

FIG. 15 is a side view of the dish carrier illustrated in FIGS. 13 and 14.

FIG. 16 is a perspective view of one wire arm or post member of the embodiment illustrated in FIG. 13.

FIG. 17 is a fragmentary side elevational view of one of the several wire holding means mounted to the bottom of the dish carrier as shown in FIG. 14.

DETAILED DESCRIPTION

Figure 10:
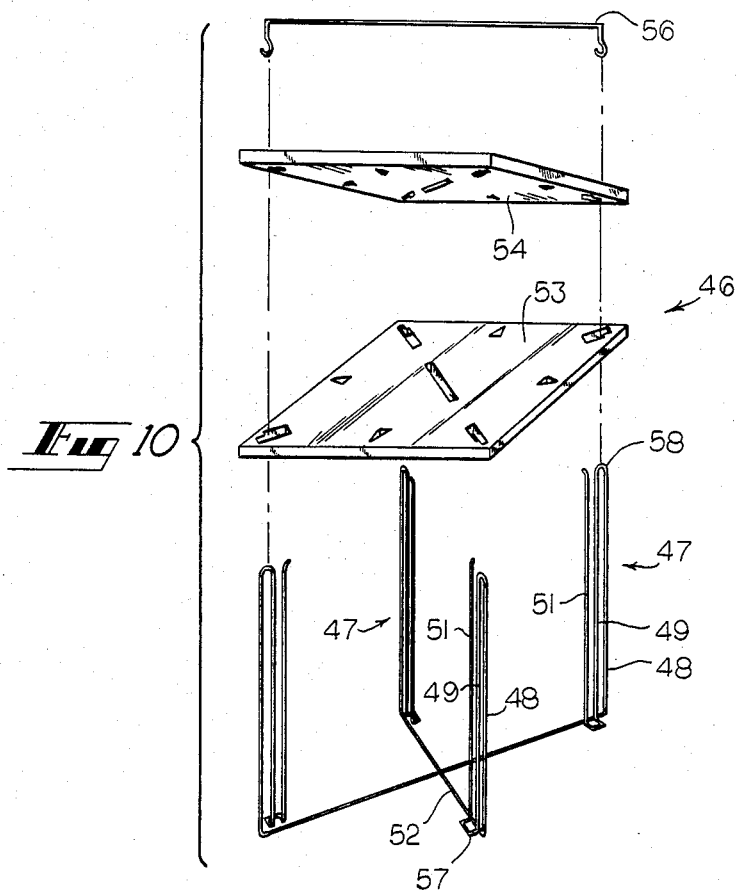
FIG. 10 is an exploded view, in perspective, of a third preferred embodiment of the dish carrier.

Referring now in more detail to the drawings in which like numerals indicate like parts throughout the several views, FIG. 1 is an exploded view showing a dish carrier 11 having a base 12 and a cover 13 of identical structure. A pair of U-shaped wire posts 15 are each seen to have a bight portion 14 that unitarily links together two double stranded arm portions 20. Each of the arms has an outer strand 17 and an inner strand 18 joined at a U-shaped bend 16 at the top end of the arm. The outer strands 17 meet with the bight 14 at L-shaped bends 19. Each inner strand 18 extends downwardly from the U-shaped bend 16 substantially parallel to the outer strand 17 to an L-shaped free end 21 located near the bend 19.

The base 12 is seen to have four triangular holes 22 formed therein and located such that the double stranded arms may be extended from the bottom of the base upwardly through the holes 22 such that they fit snuggly within the apexes of the triangular holes. As the cover 13 is identical to the base 12, it may be passed downwardly onto the top of a stack of dishes or plates supported on the base with the wire posts 20 extending through the holes 26.

A bight accepting slot 25 is formed in the bottom of the base 12. This slot is oriented and positioned between two of the holes 22 so as to accept a central portion of the bight of one of the U-shaped wire posts so that it may reside in the slot above the lower surface of the base 12. This serves to prevent a bulge from being formed at the point where the two bights of the two U-shaped posts cross. The slot 25 in the cover 13 is non functional.

The dish carrier also has a generally U-shaped handle 29 that has a bight 23 and two arms formed with hooks 24. The hooks 24 are adapted to be attached to the U-shaped bends 16 of the arms 20 which extend above the upper surface of the cover 13. In this way, the dish carrier may be hand carried from place to place by connecting the hooks 24 to the U-shaped bends 16 and lifting the dish carrier and stack of dishes therein with the cover pressed down upon the stack.

FIG. 2 shows the dish carrier 11 in its assembled carrying configuration with a stack of dishes nested between the base 12, the cover 13 and the posts 20. The handle 29 is shown releasibly connected to the bend 16 of the posts 20 via the hooks 24. The dishes in FIG. 2 are of a diameter such that they just contact the inner strands 18 and are held firmly therebetween. Dishes of a slightly larger diameter can also be stacked in the carrier. This causes the inner strands 18 to flex outwardly slightly and to bend at bend 16 applying more pressure to the top plate of the stack than to the bottom plate. This uneven pressure tends to hold the stack of dishes firmly against the base 12. Alternately, to accommodate slightly larger plates the cover can be provided with arm receiving holes of a slightly larger size than those of the base allowing the outer arms to bend outwardly at bend 19 maintaining the inner strands parallel and in firm engagement with the stack of plates.

FIG. 3 shows an alternate form of the carrier base. Here, four feet 27 are formed on the bottom of the base which extend downwardly from the base to a point below the crossing of bights 14. The dish carrier may thus be placed upon a flat surface and supported upon feet 27 with the bight portions 14 of the wire rods located between the surface and the base 12 not causing the carrier to wobble.

FIGS. 6–9 show an alternate embodiment of the dish carrier designed for temporary or one-time use. Here, the carrier has a cover 33 and a base 36 which are constructed from a lightweight, inexpensive material such as cardboard. For ease of assembly and economy of manufacture, the base 36 and the cover 33 are identical with each having four holes 42 formed adjacent their peripheries. Extending partway between two of the holes is an elongated slot 41. The carrier also has a pair of generally U-shaped wire frames or posts having a linear bight 37 and two generally parallel arms 38. The arms are adapted to be passed through the holes 42 in the base so that they extend upwardly from the base 36, as shown in FIG. 8. The upper ends of the arms are formed with inverted J-shaped hooks 39 that are oriented parallel to an adjacent edge of the cover 33. A central portion of the bight 37 of one of the U-shaped frames rests within the slot 41 so that the bight of the other U-shaped frame may cross over it while remaining linear so that a bulge is not formed by the crossing bights.

Once a stack of dishes is placed upon the base between the arms, the cover may be slid over the ends of the arms and onto the top of the stack. With a proper number of dishes stacked on the base, the upper surface of the cover is slightly above the hook portions of the arm. The periphery of the cover may then be depressed slightly in the area of the holes 42 and the hooks moved laterally to overlap the edge of holes 42. By then releasing the cover it will recoil causing the hooks to become partially embedded in the cardboard so that the cover is then held firmly down against the top of the stack of plates. A handle 34 formed of resilient wire having a curved portion 43 and generally inwardly oriented end hooks 41 may then be coupled to the ends of two of the arms, as shown in FIG. 9, through the portions of the hooks that have remained not embedded in the cardboard cover. This serves not only to provide means for hand carrying the stack but also insures that the cover remains held tightly down on the stack.

Figures 11, 12:
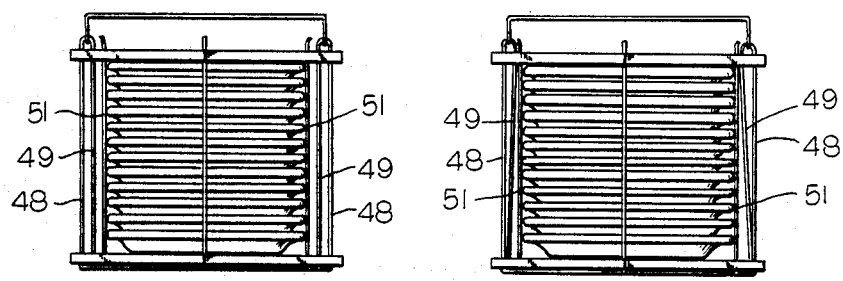
FIG. 11 is a side elevational view of the dish carrier of FIG. 10 filled with dishes of a first diameter.
FIG. 12 is a side elevation view of the dish carrier of FIG. 10 filled with dishes of a second diameter.

A third embodiment of the dish carrier is shown in FIGS. 10 through 12. In this embodiment, dish carrier 46 has a base 53, a cover 54 and a handle 56 similar to the first embodiment. Upright wire posts 47 are formed to have three arm strands in this embodiment; an outer strand 48, an inner strand 51 and a central strand 49, as shown. The outer strand and central strand extend from a bend 58. The central strand and inner strand extend from another bend 57. Bend 57 is bent laterally, as shown, to provide further support for the base 53.

When dishes of a diameter just equal to the space between opposing inner strands are stacked between the post arms, as shown in FIG. 11, the inner strands of the arms maintain constant pressure on the stack of plates, holding them in place. Dishes of a larger diameter can be stacked in which case the arms automatically compensate by virtue of the center strand skewing, as shown in FIG. 12, maintaining the inner strands parallel with respect to each other and in firm contact with the stack of dishes. In this way, a single dish carrier design can accommodate a wide range of dish sizes.

Finally, a fourth preferred embodiment of the invention is illustrated in FIGS. 13-17. Here the dish carrier 50 is seen to comprise a substantially rectangular base or base plate 51 which has four groups of slots 52 formed therein so as to form four rows of five each. The bottom surface 15 of the base is seen to have a pair of stops 53 located between each of the groups of slots and the center of the base plate. It should be noted that the stops 53 of each pair are spaced apart approximately a distance equal to the length of each of the slots 52. A pair of L-shaped catches 54 is also mounted to the bottom surface 57 of the plate adjacent and in alignment with the pairs of stops 53. The bottom of the plate also has a rim 55 which extends about the periphery of the bottom surface 57. For clarity of illustration, only two fragments of this rim has been shown in FIG. 15.

With continued reference to FIGS. 13–17, the embodiment here is further seen to include four resilient holding members or posts 60 each of which is provided by a resilient, unitary wire. The wire is shaped to have two elongated, mutually parallel arms 61 that extend from a connecting bight 62 to two legs 63 that extend normally from the ends of the arms 61 located distally from the bight 62. These arms are mounted to the plate through slots 52 with the particular slot within each of the groups of slots being selected so as to position it in holding engagement about the periphery of dishes of a particular size. Thus, since there are five slots here in each group, which extend along rows that are between the center of the carrier and its periphery, five different size plates may be carried and held by the carrier centered upon the plate. Of course, other numbers of slots may be provided and an offcenter stacking made in some unusual situation.

The resilient holding members 60 are mounted by passing the bight portion and then their arms upwardly through the selected slots. Next, the legs 63 are snapped into catches 54, as shown best in FIG. 17. Once caught within the L-shaped catches, the legs are inhibited from being accidentally unsnapped by convergent movement by the legs 63. Conversely, that the resilient legs may be moved toward or away from each other within the slots provides enough leeway for them to be momentarily bent at a skewed angle between the stops and catches in effecting their mountings. After mounting has been completed for all four of the holding means 60, only one of which has been shown in FIG. 14, it will be noted that the legs 63 will not come into contact with a supporting surface since they are shielded by the catches which themselves are positioned slightly co-planar with or elevated above the bottom of the rim 55. It thus is seen that a dish carrier is now provided which overcomes problems and limitations long associated with those of the prior art. Although the invention has been described in the form of preferred embodiments, many modifications, additions and deletions may be made thereto without departing from the spirit and scope of the invention as set forth in the claims.

What is claimed is:

1. A dish carrier comprising a base formed with at least three slots located adjacent the base periphery about a base central portion;
    at least three resilient wires adapted to be mounted to said base so as to extend through said slots, each of said resilient wires having two generally parallel arms that extend from a connecting bight to two generally parallel legs that extend angularly from said arms; and
    three holding means mounted to the bottom of said base adjacent said three slots for holding said wire legs snuggly to said base bottom with said legs extending through said slots.

2. The dish carriers of claim 1 wherein said feet extend generally normally from said legs.

3. The dish carrier of claim 1 wherein said holding means comprises a pair of L-shaped catches mounted to said base bottom adjacent one of said slots.

4. The dish carrier of claim 3 wherein the catcher of each of said pairs of catches are spaced apart approximately a distance equal to the length of said slot.

5. The dish carrier of claim 1 wherein said base is formed with at least three groups of slots located adjacent said base periphery about said base central portion, and wherein the slots of each group are mutually parallel whereby said wire arms may be mounted to said base at different distances from said base periphery to hold different size dishes.

6. The dish carrier of claim 1 wherein each of said slots is oriented generally parallel with that portion of said base periphery to which it is most closely located.

7. A dish carrier comprising a generally rectangular base plate having a substantially flat top surface and four side edges, said base plate being formed with four rows of slots that extend from adjacent said four side edges towards the base plate center, and four resilient arms releasibly mounted to said base with each arm extending through a slot of each of said four rows of slots selected with regard to the size of dishes to be carried stacked upon said base plate top surface with their sides held by said arms.

8. The dish carrier of claim 7 wherein each of said resilient arms comprises a resilient wire having two generally parallel straight arm members that extend from a connecting bight to two generally parallel straight legs that extend angularly from said arm members.

9. The dish carrier of claim 8 further comprising holding means mounted to a bottom side of said base plate adjacent an end of each of said rows of slots for holding said two legs.

10. The dish carrier of claim 9 wherein said slots are of substantially equal length, and whereas each of said holding means comprises a pair of L-shaped catches mounted to said base plate bottom spaced apart approximately a distance substantially equal to said the length of one of said slots.

* * * * *